Patented July 20, 1937

2,087,854

UNITED STATES PATENT OFFICE 2,087,854

PROCESS OF CARROTING FUR AND THE LIKE AND COMPOSITION THEREFOR

Constantine F. Fabian, Brookfield, Conn., and Alexander N. Sachanen, Woodbury, N. J., assignors to The Non-Mercuric Carrot Company, Danbury, Conn., a corporation of Connecticut No Drawing. Application July 1, 1936, Serial No. 88,382

15 Claims. (Cl. 8—21)

This invention relates to the carroting process of fur and similar animal fibers, to give such fur felting properties. It is well known that in its natural state fur lacks adequate felting properties and must be treated with certain chemical reagents to impart thereto the required felting properties. The commonly used reagents for this purpose are nitric acid and mercuric nitrate in aqueous solution.

One object of the present invention is to impart to treated animal fibers strong and even felting properties without injuring the mechanical strength of the treated fibers, their color or their capacity to be dyed.

Another object of the invention is to avoid the necessity of using noxious mercury salts and noxious vapors of nitric acid.

Another object of the invention is to avoid the necessity of using heavy metal catalyzers which are apt injuriously to affect the dyeing of fur, producing so-called yellow background on the felt.

Another object of the invention is to combine with the carroting of animal fibers, in one operation and in one carroting solution, also their cleansinating from grease and blood stains.

Another object of the invention is to provide means for accelerating the drying of treated fur by the use of compounds with low boiling points, permitting the use of such elevated temperatures as, in the case of treatment by the commonly used carroting solutions, are detrimental to the animal fibers. It is well known that, as carroting is at present practiced, the drying of treated skins at ordinary temperature requires an extended period of time, involving substantial expense and space requirements in the treatment of any considerable quantity of skins.

The carroting process comprehends complicated chemical reactions of the carroting reagents on the animal fibers. These reactions are in general of a hydrolyzing and an oxidizing nature. For this reason, carroting solutions contain acids or alkalis and oxidizers dissolved in water. Adequate carroting of fur can only be had by the simultaneous action of a hydrolyzing agent and an oxidizer acting each in the presence of the other. The use of alkaline substances is usually avoided because of the destructive action of these substances on the animal fibers. In addition to acids and oxidizers (in commonly used mercury carroting solution nitric acid is simultaneously an acid and an oxidizer), carroting solutions contain also some catalysts, as, for instance, mercuric nitrate, which is very active in these reactions. The reason for the use of catalysts is the following:

An adequate and thorough carroting of treated animal fibers can be obtained by the use of sufficiently strong solutions of acids and oxidizers. But the use of sufficiently strong concentrations of acids and oxidizers to produce a thorough carroting has heretofore been impossible due to the strong and destructive action of such solutions upon the treated animal fibers. Such concentrated carroting solutions produce not only a carroting effect but also effect a partial destruction of the animal fibers themselves. On the other hand, the carroting action of moderately concentrated carroting solutions, which are not so dangerous to animal fibers, is usually very weak and insufficient. That has led to the wide use of catalysts in carroting processes for the purpose of increasing the carroting properties of moderately concentrated carroting solutions. It is well known that in the presence of mercuric nitrate moderately concentrated solutions of nitric acid have strong carroting properties. Processes have also been employed utilizing catalytically acting substances other than mercury.

In carrying out the present invention, use is made of carroting solutions employing high concentrations of acids and oxidizers which provide a very strong carroting effect and which alone might act deleteriously and destructively upon the animal fibers, such destructive action of the strong carroting solutions, however, being avoided or inhibited by the use of suitable protective agents.

In our co-pending application, Serial No. 10,335, filed March 9, 1935, and since issued as Patent No. 2,048,645, there is disclosed and claimed the use of neutral salts added to carroting solutions and providing a protective action for the animal fibers during drying, when the concentration of the reagents becomes greater and greater and more and more detrimental to the treated fibers.

The present invention makes use of organic substances dissolved in carroting solutions which have the property of protecting the animal fibers during the carroting process as well as during the drying of the treated fibers and the storage thereof.

This invention (as the use of neutral salts also) entirely eliminates the necessity of using mercury salts or other catalytically acting substances.

We have found that organic substances suitable as inhibitors for carroting compositions are numerous. They should be soluble in water and are oxygen, sulphur or nitrogen organic compounds.

Organic oxygen compounds—as carroting inhibitors—belong to classes: alcohols, aldehydes, ketones and carbo-acids.

Organic sulphur compounds—as carroting inhibitors—belong to classes: sulpho-acids and sulphino-acids.

Organic nitrogen compounds—as carroting inhibitors—belong to classes: amines, tetrazenes and hetero-cyclic compounds containing nitrogen.

Organic substances—as carroting inhibitors soluble in water—may be also bodies having mixed functions: e. g., aldehyde-alcohols with the groups CHO and $CH_2OH$, aldehyde-acids with the groups CHO and COOH, ketone-alcohols with the groups CO and $CH_2OH$, ketone-acids with the groups CO and COOH, amido-alcohols with the groups $NH_2$ and $CH_2OH$, amido-ketones with the groups $NH_2$ and CO, amido-aldehydes with the groups $NH_2$ and CHO, amido-sulphonic acids with the groups $NH_2$ and $SO_3H$, etc.

These soluble in water oxygen, sulphur, nitrogen and mixed function organic compounds can be derivatives either of open chains or cyclic hydrocarbons.

As an example of organic compounds soluble in water, which protect the animal fibers from destructive action of concentrated carroting reagents, we may use, for instance, ethyl alcohol, ethylene glycol, glycerine, resorcinol, pyrogallol, acetone, formalin, sugar, molasses, salicyl-aldehyde, mandelic acid, lactic acid, glycolic acid, glycine, urea, triethylamine, triethanolamine, dimethylaniline, benzene-sulphonic acid, pyridine, quinoline, etc. It is understood that such organic compounds as triethylamine, pyridine, etc., are converted into corresponding salts with the acids of carroting solutions.

The quantity of used organic compounds ordinarily varies from about 4% to 10% by weight in carroting solutions.

However, for certain skins we use greater concentrations of such organic liquid substances, as ethyl alcohol or acetone. It is to be noted that these organic liquids, in addition to their protective action, have cleansing and penetrating properties. Carroting solutions with high contents of such liquids remove fat or blood ingredients of skins and facilitate the penetration of carroting ingredients to the treated fibers. For this reason, high concentration of such liquids in carroting solutions is recommended either for fur which is contaminated with grease and blood or for fur which has very long and dense hairs, as American Double Ring, Haresfur, etc. Both kinds of fur give with usual carroting solutions an uneven carrot due to the insufficient penetration of carroting ingredients to fibers contaminated with fat or to fibers too long and dense. For such furs the concentration of ethyl alcohol and similar liquids in carroting solutions may be so high that the carroting process may be carried out practically in semi-aqueous or almost non-aqueous solutions which, however, are herein included under the generic term "aqueous".

The organic substances, mentioned above, may be used alone or in combination with inorganic protective agents, in other words, inorganic neutral salts of the type described in our copending application, Serial No. 10,335, filed March 9, 1935, issued as Patent No. 2,048,645, dated July 21, 1936. These salts comprise water-soluble substantially neutral salts of strong inorganic acids and strong bases preferably salts of strong polybasic inorganic acids and alkali metals, such as bisodium sulphate and trisodium phosphate. It is obvious that this combination of two protective agents strengthens the protection of treated fibers against a destructive action of carroting reagents.

While our invention is not restricted by any theory which may be advanced to account for the precise action of the ingredients employed,—the main point being that they accomplish the results herein described,—the improvement resulting in the described protective action appears to be governed by the following.

The molecules of animal fibers are oxidized not by all oxidizer molecules which are in collision with them, but only by active molecules which have a certain excess of energy in comparison with "average" molecules. As result of this oxidization, a certain amount of energy is liberated, and this energy activates some oxidizer molecules and enables them to further oxidize the animal fibers. For this reason, the oxidation consists of a series of consecutive oxidation and activation processes or chain reactions. The molecules of an inhibitor are able to take up the energy which is liberated in oxidation, in some way or another and to interrupt the continuous series of chain reactions.

The mechanism of the absorption of the energy, liberated in oxidation in our process may be the following.

The activated molecules of the oxidizer, which have an excess of energy, react with molecules of our organic protective substances and form compounds like oxonium salts or similar salt compounds with high valences of oxygen, nitrogen or sulphur. For this reason, highly activated molecules of the oxidizer lose the excess of energy and become incapable of a strong oxidation of animal fibers. Consequently the process of oxidation is carried on moderately and practically without any destructive action on animal fibers.

We have found that our protective agent moderates and inhibits not only the oxidizing action of oxidizers, used in carroting solutions, but also the hydrolyzing action of acids used. We believe that the mechanism of this protection against an excessive hydrolyzing action of acids may be explained by the same theory of chain reactions. The hydrolysis of animal fibers is effected by certain acid molecules or hydrogen ions which are activated and have an excess of energy. This process activates other acid molecules or hydrogen ions and makes them capable of a further strong hydrolytic action, in the absence of protective substances. In the presence of such substances, the activated acid molecules or hydrogen ions give up their excess of energy to molecules of protective substances due, probably, to the formation of compounds of an oxonium type. It is well known that many alcohols and ethers form such compounds with inorganic acids.

The simultaneous action of an oxidizer, a hydrolyzing acid and the organic inhibitor, each in the presence of the other, is necessary to effect the carroting of the fur with the required inhibiting action on both the hydrolyzation and the oxidation.

As acids in our carroting solutions we use any nonoxidizing acids which give a sufficiently strong hydrolyzing action, for instance, sulphuric, hydrochloric, phosphoric, trichloracetic, oxalic, etc.

It is a feature of the invention that it makes possible a strong concentration of the acid as well as a relatively strong concentration of the oxidizer, which, without the use of the inhibitor, would be harmful to the fur. For example, in the case of sulphuric acid, when used as the sole hydrolyzing agent, we prefer to use approximately from 5 to 10% (dependent on the nature of the fur) of technical acid (approximately 92-93% concentration); in the case of hydrochloric acid, when used alone, approximately from 10 to 15% of technical acid (approximately 35% concentration); and in the case of phosphoric acid, when used alone, approximately from 5 to 8% (crystals 100%). In the case of the use of a plurality of acids a substantially similarly strong hydrolyzing effect is aimed at.

As oxidizers in our carroting solutions we use any oxidizers which give a sufficiently strong oxidizing action, for instance, hydrogen peroxide, persulphates, chlorates, organic peroxides, etc. The strength of the oxidizing agent is also relatively high. For example, in the case of hydrogen peroxide, we prefer to use from 4 to 8% (dependent on the nature of the fur) of a 30% solution. In the case of potassium and ammonium persulphates or potassium chlorate we find that approximately from 3 to 10% (dependent on the nature of the fur) on a 100% basis gives the desired high strength of oxidation.

As in the process disclosed in our co-pending application, Serial No. 10,335, we may and preferably do employ the combinations of two or more acids and two or more oxidizers.

The application of our carroting solutions to skins is carried out by brushing or by spraying. Cut hairs can be carroted also. Due to the presence of protective agents, skins, including the skins of white fur, carroted by our solutions may be dried at high artificial temperatures without any detrimental effect on the treated animal fibers. Use may be made in the dryer of such high temperatures as 170-200° F. (dependent on the nature of the fur), which enormously facilitate and accelerate the drying process. Heretofore it has been impossible to dry the skins of white fur at such elevated temperatures due to a resulting change in color.

The following comparative experiments demonstrate the advantageous action of the organic inhibitor.

White fur (white coney) was first carroted by a solution of hydrogen peroxide and sulphuric acid. The concentration of each ingredient was 6% by weight. When the temperature of drying was normal, the carroting effect was too weak to make the fur available for practical felting. The fur required for felting 8 rounds "wetting down" (the initial shrinking operation) and 45 minutes on what is known as machine "B" (commonly used for effecting the final shrinkage to size and usually after dyeing), whereas for this type of fur more than 5 rounds "wetting down" and more than 25 minutes on machine "B" is too slow felting for practical use. With the temperature of drying raised to 175° F., the carroting effect was better, the number of rounds being reduced to 6 and the time on machine "B" reduced to 35 minutes. But in the latter instance the action of the reagents upon the fibers was destructive, the fibers treated being yellow and partly burnt. With higher concentrations of reagents, the detrimental action of the carroting solution on the fibers became excessive, the fibers becoming in large part black and destroyed. It is evident, that the action alone of an oxidizer and an acid on fur is either insufficient to produce an adequate carrot or destructive.

We then carroted the same kind of fur by increasing the concentration of sulphuric acid to 7% and the concentration of hydrogen peroxide to 8%, adding 8-10% of ethyl alcohol, and with this solution secured an entirely satisfactory carrot. After drying at 175-200° F., the number of rounds of "wetting down" was found to be 3½ and the time on machine "B" 15 minutes, the fur being white and intact in spite of the use of very strong acid and oxidizer solutions.

The invention will be better understood by the following specific examples of our carroting solutions which may be prepared according to the general idea of our invention and intended for application to the animal fibers on the skins:

Example 1

| | Per cent |
|---|---|
| Hydrochloric acid | 15 |
| Hydrogen peroxide | 7 |
| Ethyl alcohol in aqueous solution | 8 |

Example 2

| | Per cent |
|---|---|
| Sulphuric acid | 7 |
| Ammonium persulphate | 4 |
| Potassium chlorate | 5 |
| Acetone in aqueous solution | 8 |

Example 3

| | Per cent |
|---|---|
| Hydrochloric acid | 6 |
| Phosphoric acid | 6 |
| Hydrogen peroxide | 8 |
| Molasses in aqueous solution | 8 |

Example 4

| | Per cent |
|---|---|
| Sulphuric acid | 6 |
| Hydrogen peroxide | 8 |
| Ethylene glycol | 8 |
| Sodium sulphate in aqueous solution | 4 |

Example 5

| | Per cent |
|---|---|
| Sulphuric acid | 6 |
| Hydrochloric acid | 1 |
| Ammonium persulphate | 3½ |
| Benzene-sulphonic acid | 5 |
| Potassium chlorate in aqueous solution | 5 |

Example 6

| | Per cent |
|---|---|
| Sulphuric acid | 8 |
| Formic acid | 1 |
| Sodium sulphate | 2 |
| Triethanolamine | 4 |
| Potassium persulphate | 3½ |
| Hydrogen peroxide in aqueous solution | 6 |

Example 7

| | Per cent |
|---|---|
| Sulphuric acid | 7 |
| Acetic acid | 1 |
| Quinoline | 3 |
| Ethyl alcohol | 10 |
| Ammonium persulphate in aqueous solution | 3 |

Example 8

| | Per cent |
|---|---|
| Phosphoric acid | 7 |
| Hydrochloric acid | 2 |
| Sodium sulphate | 2 |
| Pyridine | 3 |
| Ammonium persulphate | 4 |
| Potassium chlorate in aqueous solution | 6 |

Claims directed to soluble organic nitrogen-containing inhibitors, soluble sulphur-containing inhibitors, and soluble carbo-acid inhibitors are presented in co-pending divisional applications filed June 4, 1937, Serial Nos. 146,414, 146,415 and 146,416, respectively.

Various changes in and departures from the embodiment of our carroting composition may be made as the same have been heretofore exemplified, all within the scope of our generic invention, it being understood that the matter hereinbefore set forth is submitted as illustrative and not in a limiting sense.

We claim:

1. An aqueous carroting solution for treating fur and the like containing an oxidizing agent and an acid hydrolyzer, and containing also an inhibitor comprising a water-soluble, organic, oxygen-containing compound present in amount to prevent harmful action on the fur of the oxidizing agent and the hydrolyzer, said solution being substantially free from heavy metal catalytic agents.

2. An aqueous carroting solution for treating fur and the like containing an oxidizing agent and an acid hydrolyzer, and containing also an inhibitor comprising a water-soluble, organic, oxygen-containing, alcohol compound present in amount to prevent harmful action on the fur of the oxidizing agent and the hydrolyzer, said solution being substantially free from heavy metal catalytic agents.

3. An aqueous carroting solution for treating fur and the like containing an oxidizing agent and an acid hydrolyzer, and containing also an inhibitor comprising a water-soluble, organic, oxygen-containing compound consisting of ethyl alcohol present in amount to prevent harmful action on the fur of the oxidizing agent and the hydrolyzer, said solution being substantially free from heavy metal catalytic agents.

4. An aqueous carroting solution for treating fur and the like containing an oxidizing agent and an acid hydrolyzer, and containing also an inhibitor comprising a water-soluble, organic, oxygen-containing, ketone compound present in amount to prevent harmful action on the fur of the oxidizing agent and the hydrolyzer, said solution being substantially free from heavy metal catalytic agents.

5. An aqueous carroting solution for treating fur and the like containing an oxidizing agent and an acid hydrolyzer, and containing also an inhibitor comprising a water-soluble, organic, oxygen-containing compound consisting of acetone present in amount to prevent harmful action on the fur of the oxidizing agent and the hydrolyzer, said solution being substantially free from heavy metal catalytic agents.

6. An aqueous carroting solution for treating fur and the like containing an oxidizing agent and an acid hydrolyzer, and containing also an inhibitor comprising a water-soluble, organic, oxygen-containing, aldehyde compound present in amount to prevent harmful action on the fur of the oxidizing agent and the hydrolyzer, said solution being substantially free from heavy metal catalytic agents.

7. An aqueous carroting solution for treating fur and the like containing an oxidizing agent and an acid hydrolyzer, and containing also an inhibitor comprising a water-soluble, organic, oxygen-containing compound consisting of formalin present in amount to prevent harmful action on the fur of the oxidizing agent and the hydrolyzer, said solution being substantially free from heavy metal catalytic agents.

8. An aqueous carroting solution for treating fur and the like containing an oxidizing agent and an acid hydrolyzer, and containing also an inhibitor comprising a water-soluble, organic, oxygen-containing compound present in amount to prevent harmful action on the fur of the oxidizing agent and the hydrolyzer, there being present in the solution also a water-soluble, neutral salt of a strong inorganic acid and a strong base, said solution being substantially free from heavy metal catalytic agents.

9. An aqueous carroting solution for treating fur and the like containing an oxidizing agent and an acid hydrolyzer and containing also an inhibitor comprising a water-soluble, organic, oxygen-containing compound present in amount to prevent harmful action on the fur of the oxidizing agent and the hydrolyzer, the acid hydrolyzer being present in the solution in a concentration of an order represented by from 5 to 10% of technical sulphuric acid of approximately 92%, said solution being substantially free from heavy metal catalytic agents.

10. An aqueous carroting solution for treating fur and the like containing an oxidizing agent and an acid hydrolyzer and containing also an inhibitor comprising a water-soluble, organic, oxygen-containing compound present in amount to prevent harmful action on the fur of the oxidizing agent and the hydrolyzer, the acid hydrolyzer being present in the solution in a concentration of an order represented by from 5 to 10% of technical sulphuric acid of approximately 92%, and there being present in the solution also a water-soluble, neutral salt of a strong inorganic acid and a strong base in an amount less than that of the acid, said solution being substantially free from heavy metal catalytic agents.

11. The process of preparing fur and the like for felting, which comprises treating the fur with an aqueous carroting solution containing an oxidizing agent and an acid hydrolyzer, said solution being substantially free from heavy metal catalytic agents, checking the carroting action of such solution by an inhibitor comprising a water-soluble, organic, oxygen-containing compound present in the solution in amount to prevent harmful action on the fur of the oxidizing agent and the hydrolyzer, and causing such solution to dry on the fur.

12. The process of preparing fur and the like for felting, which comprises treating the fur with an aqueous carroting solution containing an oxidizing agent and an acid hydrolyzer, said solution being substantially free from heavy metal catalytic agents, checking the carroting action of such solution by an inhibitor comprising a water-soluble, organic, oxygen-containing, alcohol compound present in the solution in amount to prevent harmful action on the fur of the oxidizing agent and the hydrolyzer, and causing such solution to dry on the fur.

13. The process of preparing fur and the like for felting, which comprises treating the fur with an aqueous carroting solution containing an oxidizing agent and an acid hydrolyzer, said solution being substantially free from heavy metal catalytic agents, checking the carroting action of such solution by an inhibitor comprising a water-soluble, organic, oxygen-containing, ketone compound present in the solution in amount to prevent harmful action on the fur of the oxidizing agent and the hydrolyzer, and causing such solution to dry on the fur.

14. The process of preparing fur and the like for felting, which comprises treating the fur with an aqueous carroting solution containing an oxidizing agent and an acid hydrolyzer, said solution being substantially free from heavy metal catalytic agents, checking the carroting action of such solution by an inhibitor comprising a water-soluble, organic, oxygen-containing, aldehyde compound present in the solution in amount to prevent harmful action on the fur of the oxidizing agent and the hydrolyzer, and causing such solution to dry on the fur.

15. The process of preparing fur and the like for felting, which comprises treating the fur with an aqueous carroting solution containing an oxidizing agent and an acid hydrolyzer, the latter present in the solution in a concentration of an order represented by from 5 to 10% of technical sulphuric acid of approximately 92%, said solution being substantially free from heavy metal catalytic agents, checking the carroting action of such solution by an inhibitor comprising a water-soluble, organic, oxygen-containing compound present in the solution in amount to prevent harmful action on the fur of the oxidizing agent and the hydrolyzer, and causing such solution to dry on the fur.

CONSTANTINE F. FABIAN.
ALEXANDER N. SACHANEN.